(12) United States Patent
Jung

(10) Patent No.: US 11,850,999 B2
(45) Date of Patent: Dec. 26, 2023

(54) APPARATUS AND METHOD FOR CONTROLLING DRIVING OF VEHICLE

(71) Applicants: HYUNDAI MOTOR COMPANY, Seoul (KR); KIA CORPORATION, Seoul (KR)

(72) Inventor: Chan Hee Jung, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 301 days.

(21) Appl. No.: 17/244,530

(22) Filed: Apr. 29, 2021

(65) Prior Publication Data

US 2022/0041160 A1 Feb. 10, 2022

(30) Foreign Application Priority Data

Aug. 4, 2020 (KR) .................. 10-2020-0097468

(51) Int. Cl.
| | |
|---|---|
| B60Q 1/34 | (2006.01) |
| B60Q 1/38 | (2006.01) |
| B60Q 1/46 | (2006.01) |
| B60Q 1/50 | (2006.01) |
| B60W 30/08 | (2012.01) |
| B60W 30/095 | (2012.01) |
| B60W 30/14 | (2006.01) |
| B60W 40/02 | (2006.01) |
| B60W 30/18 | (2012.01) |
| B60W 50/14 | (2020.01) |

(Continued)

(52) U.S. Cl.
CPC .............. B60Q 1/46 (2013.01); B60Q 1/381 (2022.05); B60Q 1/525 (2013.01); B60W 30/0956 (2013.01); B60W 30/143 (2013.01); B60W 30/18163 (2013.01)

(58) Field of Classification Search
CPC .... B60K 2370/178; B60Q 1/46; B60Q 1/525; B60Q 1/381; B60Q 1/346; B60W 30/0956; B60W 30/143; B60W 30/18163; B60W 50/14; B60W 2050/143; B60W 30/095; B60W 30/08; B60W 40/02; B60W 40/105; B60W 60/0015; B60W 2720/10; B60Y 2300/08; B60Y 2300/18166; G08G 1/167
USPC ........................................................ 701/41
See application file for complete search history.

(56) References Cited

U.S. PATENT DOCUMENTS

2016/0347175 A1* 12/2016 Yamashita ............. B60K 31/00
2017/0240172 A1* 8/2017 Nishiguchi ..... B60W 30/18163
(Continued)

OTHER PUBLICATIONS

European Search Report dated Oct. 26, 2021.

*Primary Examiner* — Abby Y Lin
*Assistant Examiner* — Hossam M Abd El Latif
(74) *Attorney, Agent, or Firm* — MORGAN, LEWIS & BOCKIUS LLP

(57) ABSTRACT

An apparatus and a method for controlling driving of a vehicle are provided. The apparatus includes a sensor configured to obtain driving environment information and vehicle driving information, and a controller configured to calculate a time to collision with a following vehicle based on the driving environment information when a lane change is necessary to be performed while flashing an emergency light, and to control flashing of the emergency light or a turn indicator based on the time to collision and the vehicle driving information when the lane change is performed.

16 Claims, 6 Drawing Sheets

(51) Int. Cl.
  *B60W 60/00*    (2020.01)
  *G08G 1/16*     (2006.01)
  *B60W 40/105*   (2012.01)

(56) References Cited

U.S. PATENT DOCUMENTS

| | | |
|---|---|---|
| 2017/0355368 A1* | 12/2017 | O'Dea ................. B60W 30/16 |
| 2019/0300053 A1  | 10/2019 | Mizoguchi |
| 2019/0308617 A1* | 10/2019 | Groult ..................... B60Q 1/46 |
| 2019/0333381 A1* | 10/2019 | Shalev-Shwartz .......................... B60W 30/0956 |
| 2020/0055517 A1  | 2/2020  | Kim |
| 2020/0148202 A1* | 5/2020  | Staudacher ........... B60W 10/30 |
| 2020/0180638 A1* | 6/2020  | Kanoh ................ B60W 30/095 |

\* cited by examiner

APPARATUS AND METHOD FOR CONTROLLING DRIVING OF VEHICLE

CROSS-REFERENCE TO RELATED APPLICATION

This application claims the priority to and the benefit of Korean Patent Application No. 10-2020-0097468, filed on Aug. 4, 2020, the entire contents of which are incorporated herein by reference.

TECHNICAL FIELD

The present disclosure relates to an apparatus and a method for controlling driving of a vehicle.

BACKGROUND

In an autonomous driving mode of an autonomous vehicle, there is a case where it is necessary to perform a lane change while flashing an emergency light. For example, in the case of a minimum risk maneuver (MRM) stage in autonomous driving Lv. 3, an emergency light must be flashed, and a strategy of decelerating and stopping on the driving lane or changing the lane to a shoulder and stopping may be established. Therefore, when it is required to change lanes while flashing an emergency light, control of flashing an emergency light and flashing a turn indicator must be performed corresponding to the situation.

SUMMARY

An aspect of the present disclosure provides an apparatus and a method for controlling driving of a vehicle capable of controlling an emergency light and a turn indicator appropriately in situations during autonomous driving.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle includes a sensor that obtains driving environment information and vehicle driving information of the vehicle, and a controller that calculates a time to collision with a vehicle at a rear side based on the driving environment information when a lane change is necessary to be performed while flashing an emergency light, and controls flashing of the emergency light or a turn indicator based on the time to collision and the vehicle driving information when the lane change is performed.

A state in which the lane change is necessary to be performed while flashing the emergency light may include a minimal risk management (MRM) state.

The controller may control to reduce a driving speed or increase the driving speed while flashing the emergency light in a driving lane when the controller determines that the time to collision is less than a first time.

The controller may control to perform the lane change while flashing the emergency light when the controller determines that the time to collision exceeds a second time longer than the first time.

The controller may control to stop flashing the emergency light and perform the lane change while flashing the turn indicator when the time to collision is equal to or more than the first time and equal to or less than the second time.

The controller may determine whether a progress state of the lane change exceeds a threshold value and may control to stop flashing the turn indicator and perform the lane change while flashing the emergency light when the progress state of the lane change exceeds the threshold value.

The controller may determine whether the time to collision exceeds a third time longer than the second time when the controller determines that the progress state of the lane change does not exceed the threshold value.

The controller may control to stop flashing the turn indicator and perform the lane change while flashing the emergency light when the controller determines that the time to collision exceeds the third time.

The controller may control to perform the lane change while flashing the turn indicator when the controller determines that the time to collision does not exceed the third time.

According to another aspect of the present disclosure, a method of control driving of a vehicle includes obtaining driving environment information and vehicle driving information of the vehicle, calculating a time to collision with a vehicle at a rear side based on the driving environment information when a lane change is necessary to be performed while flashing an emergency light, and controlling flashing of the emergency light or a turn indicator based on the time to collision and the vehicle driving information when the lane change is performed.

A state in which the lane change is necessary to be performed while flashing the emergency light may include a minimal risk management (MRM) state.

The method may further include controlling to reduce a driving speed or increase the driving speed while flashing the emergency light in a driving lane when it is determined that the time to collision is less than a first time.

The method may further include controlling to perform the lane change while flashing the emergency light when it is determined that the time to collision exceeds a second time longer than the first time.

The method may further include controlling to stop flashing the emergency light and perform the lane change while flashing the turn indicator when the time to collision is equal to or more than the first time and equal to or less than the second time.

The method may further include determining whether a progress state of the lane change exceeds a threshold value, and controlling to stop flashing the turn indicator and perform the lane change while flashing the emergency light when the progress state of the lane change exceeds the threshold value.

The method may further include determining whether the time to collision exceeds a third time longer than the second time when it is determined that the progress state of the lane change does not exceed the threshold value.

The method may further include controlling to stop flashing the turn indicator and perform the lane change while flashing the emergency light when it is determined that the time to collision exceeds the third time.

The method may further include controlling to perform the lane change while flashing the turn indicator when it is determined that the time to collision does not exceed the third time.

DRAWINGS

The above and other objects, features and advantages of the present disclosure will be more apparent from the following detailed description taken in conjunction with the accompanying drawings.

DETAILED DESCRIPTION

Figure 1:
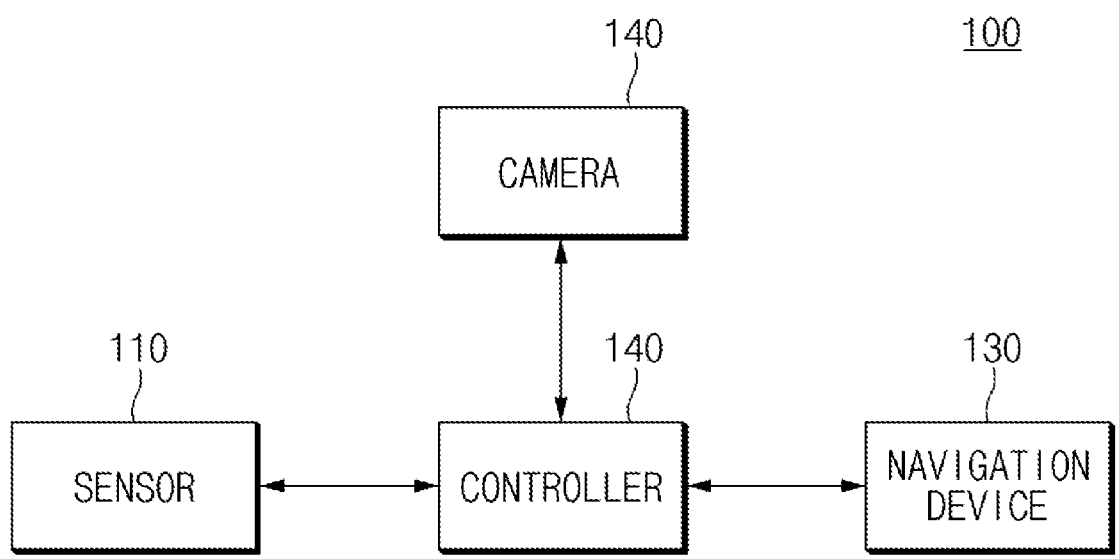
FIG. 1 is a view illustrating the configuration of an apparatus for controlling driving of a vehicle in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of an apparatus for controlling driving of a vehicle in some forms of the present disclosure.

As shown in FIG. 1, an apparatus 100 for controlling driving of a vehicle may include a sensor 110, a camera 120, a navigation device 130, and a controller 140.

The sensor 110 may obtain driving environment information and vehicle driving information of a vehicle. In this case, the driving environment information may include surrounding environment information obtained during driving of a vehicle. According to an embodiment, the sensor 110 may include a distance sensor, an image sensor, an infrared sensor, and the like which are capable of obtaining obstacle information around the vehicle, driver state information, road information, and the like. In addition, the vehicle driving information may include information obtained while the vehicle is driving. According to an embodiment, the sensor 110 may include a vehicle speed sensor, a steering angle sensor, an input sensor, or the like that can obtain speed information, steering information, user input information (switch input information), and the like.

The distance sensor may detect an obstacle in front of the vehicle. According to an embodiment, the distance sensor may detect an object outside a vehicle, a preceding vehicle traveling in front, a road, a structure installed around a road, and the like. As an example, the distance sensor may include a radar and a lidar.

The image sensor may obtain an image outside or inside a vehicle. According to an embodiment, the image sensor may include a CCD or CMOS sensor that obtains a line image of a lane on which the vehicle is traveling, or an image of the front and rear, left and right sides of the vehicle.

The infrared sensor may detect driver state information (dispersion of the driver's gaze, whether eyes are opened or closed) by using infrared information of the driver.

The vehicle speed sensor may mean a sensor that detects the driving speed of the vehicle, the steering angle sensor may mean a sensor that detects the rotation torque of a steering wheel, and the input sensor may mean a sensor that detects user input information.

The steering angle sensor may mean a sensor that detects the rotation torque of a steering wheel.

The input sensor may mean a sensor that detects the input information of an emergency light switch or a turn indicator switch.

The camera 120 may include an image sensor, and may include at least one camera or more arranged on the front, rear, left and right of the vehicle.

The navigation device 130 may include a GPS receiver that receives each position signal from a plurality of satellite positioning system satellites, and calculates the location of the vehicle from the position signal. The navigation device 130 may map the vehicle location calculated at the GPS receiver to previously stored map data, receive destination information from a user, search for a route from the calculated vehicle location to the destination, and guide the searched route.

The controller 140 may be implemented with various processing devices such as a microprocessor including a semiconductor chip capable of performing operation or execution of various commands, and, based on at least one algorithm stored in the storage, may control the overall operation of an apparatus for controlling driving of a vehicle according to an embodiment of the present disclosure. In detail, the controller 140 may determine whether the vehicle is in a state in which lane change is to be performed while flashing an emergency light, based on the driving environment information. In such a state, the controller 140 may calculate the time to collision with a rear side vehicle, and may control to flash the emergency light or the turn indicator based on the time to collision and the vehicle driving information. In this case, the state of the vehicle in which the lane change is required while flashing the emergency light may include a minimal risk management (MRM) state at the autonomous driving Lv. 3.

According to an embodiment of the present disclosure, even when a driver intervenes in autonomous driving to perform a lane change during driving of the vehicle, the flashing of the emergency light or turn indicator according to the present disclosure may be controlled based on the time to collision with the rear side vehicle and vehicle driving information.

The controller 140 determines whether the vehicle is in a state in which the vehicle is to change the lane while flashing the emergency light, based on the driving environment information. The above-described state may mean a state in which the emergency light is flashed and the lane change is performed by the MRM. For example, when driving control authority is not transferred to the driver, the state may mean a state in which the emergency light is flashed and the lane change is performed to safely stop the vehicle.

When it is determined that the vehicle state is a state in which the lane change is to be performed while flashing the emergency light, the controller 140 may calculate a time to collision (TTC) with a rear side vehicle. In this case, the time to collision may be calculated in a scheme well known in the art based on the distance between a host vehicle and a rear side vehicle, a host vehicle speed, and a rear side vehicle speed.

The controller 140 may control the switching of flashing an emergency light or flashing a turn indicator in consideration of the time to collision with the rear side vehicle and the location of the host vehicle. According to an embodiment, the controller 140 may control the switching of flashing an emergency light or a turn indicator as shown in following Table 1.

TABLE 1

| | Condition | Control scheme |
|---|---|---|
| 1 | Time to collision < First time | Decrease driving speed or increase driving speed while flashing emergency light |
| 2 | First time ≤ Time to collision ≤ Second time | Switch to flashing turn indicator and change lane |
| 3 | Time to collision > Second time | Change lane while flashing emergency light |

In detail, as described in Table 1, when it is determined that the time to collision is less than the first time (where the first time may mean the minimum time to collision for which it is possible to change the lane), the controller 140 may determine that the time to collision with the rear side vehicle is short so that it is impossible to change the lane. Thus, the controller 140 may decrease the driving speed of the vehicle or increase the driving speed while flashing the emergency light in the lane in which the vehicle is traveling until it reaches the lane change time point. In addition, as shown in Table 1, when it is determined that the time to collision is equal to or greater than the first time and equal to or less than the second time (where the second time may mean the maximum time to collision for which it is possible to change the lane), the controller 140 may determine that the lane change is possible without colliding with the rear side vehicle, and may switch to the flashing of the turn indicator such that the notification of the lane change of the autonomous vehicle is preferentially guided. Accordingly, the flashing of the emergency light may be switched to the flashing of the turn indicator, and the lane change may be performed.

In addition, the controller 140, as shown in Table 1, when it is determined that the time to collision exceeds the second time, the controller 140 may determine that the lane change is possible without colliding with the rear side vehicle without flashing the turn indicator. According to an embodiment, the controller 140 may control the flashing of the emergency light to be maintained.

When the turn indicator flashes and the lane change is performed, the controller 140 may control the flashing of the emergency light or the turn indicator corresponding to the progress state of the lane change. The details will be described with reference to FIGS. 2 to 4.

Figure 2:
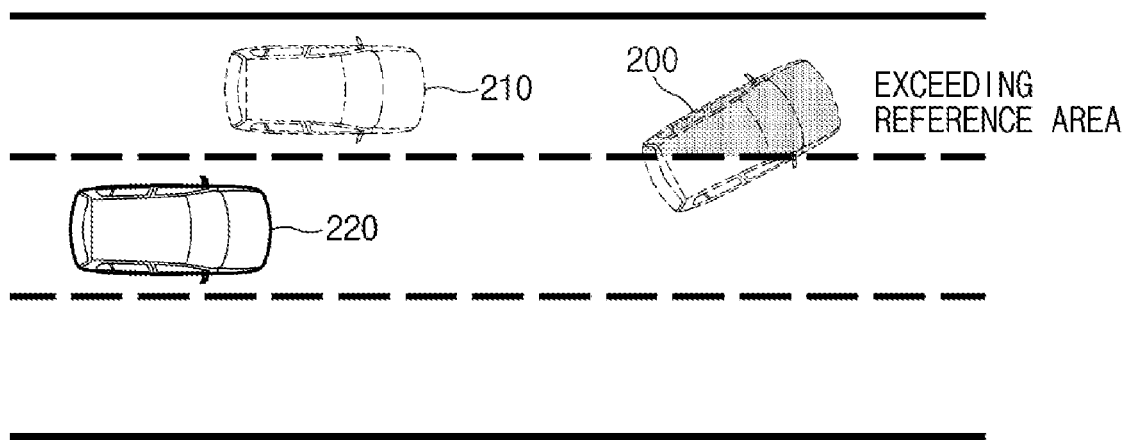
FIG. 2 is a view illustrating the progress state of a lane change in one form of the present disclosure.
Figure 3:
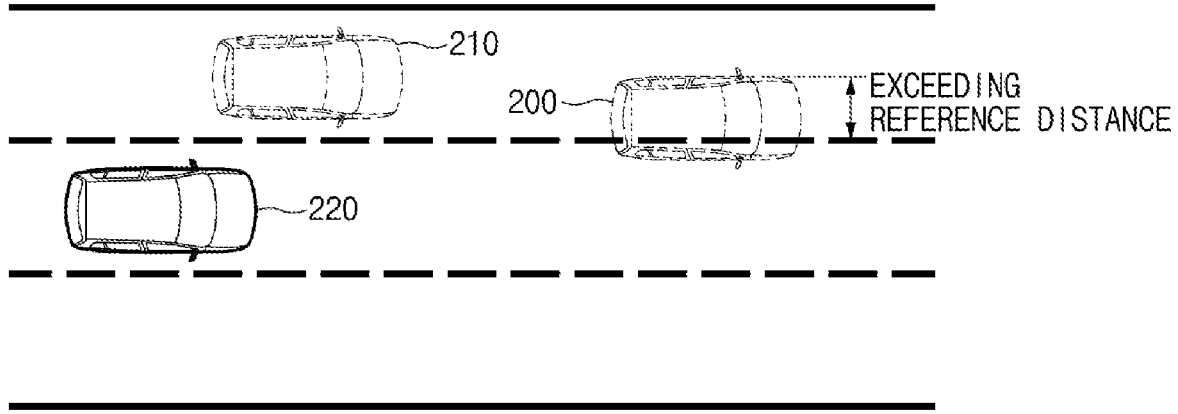
FIG. 3 is a view illustrating the progress state of a lane change in one form of the present disclosure.
Figure 4:
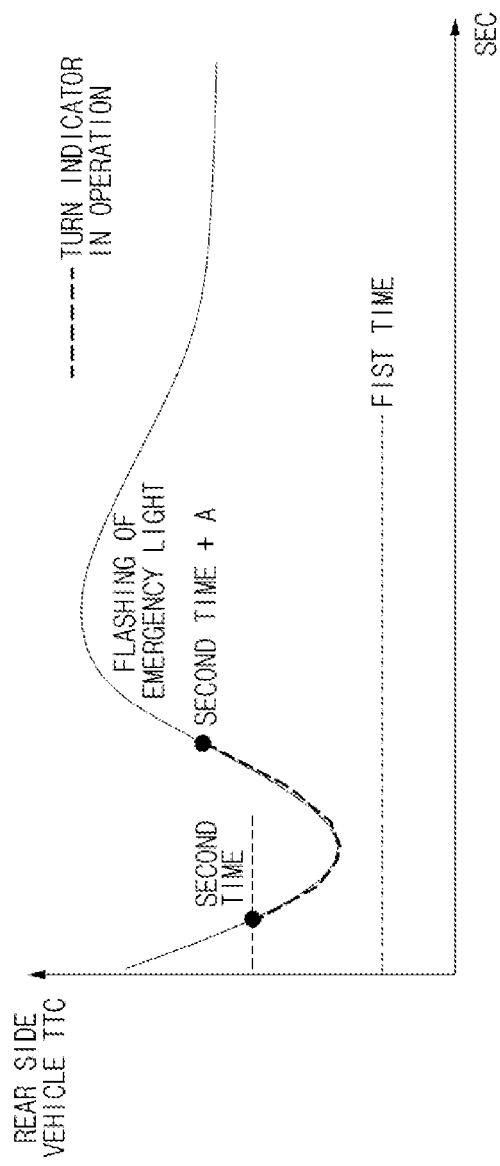
FIG. 4 is a view illustrating the flashing states of a turn indicator and an emergency light based on a TTC in one form of the present disclosure.

FIG. 2 is a view illustrating the progress state of a lane change in some forms of the present disclosure. FIG. 3 is a view illustrating the progress state of a lane change according to another embodiment of the present disclosure. FIG. 4 is a view illustrating the flashing states of a turn indicator and an emergency light based on a TTC according to an embodiment of the present disclosure.

As shown in FIGS. 2 to 4, the controller 140 may determine the progress state of the lane change during the lane change of a host vehicle 200, and control the flashing of the emergency light or the turn indicator corresponding to the determination result. According to an embodiment, the controller 140 may determine whether a degree at which the host vehicle 200 is separated from the line exceeds a threshold value in order to determine the progress state of the lane change. For example, the controller 140 may determine whether the host vehicle 200 exceeds a reference area or a reference distance from a line. In this case, the reference area may mean 80% of the total area of a vehicle, and the reference distance may mean a distance (e.g., 1.5 m) between the vehicle and a line.

When the controller 140 determines that the host vehicle 200 exceeds the reference area or the reference distance from the line during the lane change, the controller 140 may determine that the lane change of the host vehicle 200 is nearly completed. Accordingly, the controller 140 may switch from the flashing of the turn indicator light to the flashing of the emergency light, and may perform the lane change until the lane change is completed.

Meanwhile, when the controller 140 determines that the host vehicle 200 does not exceed the reference area or the reference distance from the line during the lane change, the controller 140 may determine whether the time to collision with a rear side vehicle 210 exceeds (the second time+A). In this case, the 'A' may mean a hysteresis value set such that the switching between the flashing of the emergency light and the flashing of the turn indicator is not repeatedly performed.

When the controller 140 determines that the time to collision between the host vehicle 200 and the rear side vehicle 210 during the lane change exceeds (the second time+A), the controller 140 may determine that it is possible to change the lane without collision with the rear side vehicle without flashing the turn indicator. According to an embodiment, the controller 140 may switch from the flashing of the turn signal to the flashing of the emergency light and perform the lane change.

When the controller 140 determines that the time to collision between the host vehicle 200 and the rear side vehicle 210 during the lane change does not exceed (the second time+A), the controller 140 may determine that the lane change is possible without collision with the rear side vehicle and may switch to the flashing of the turn indicator such that the notification of the lane change of the autonomous vehicle is preferentially guided. Accordingly, the flashing of the emergency light may be switched to the flashing of the turn indicator, and the lane change may be performed.

Figure 5:
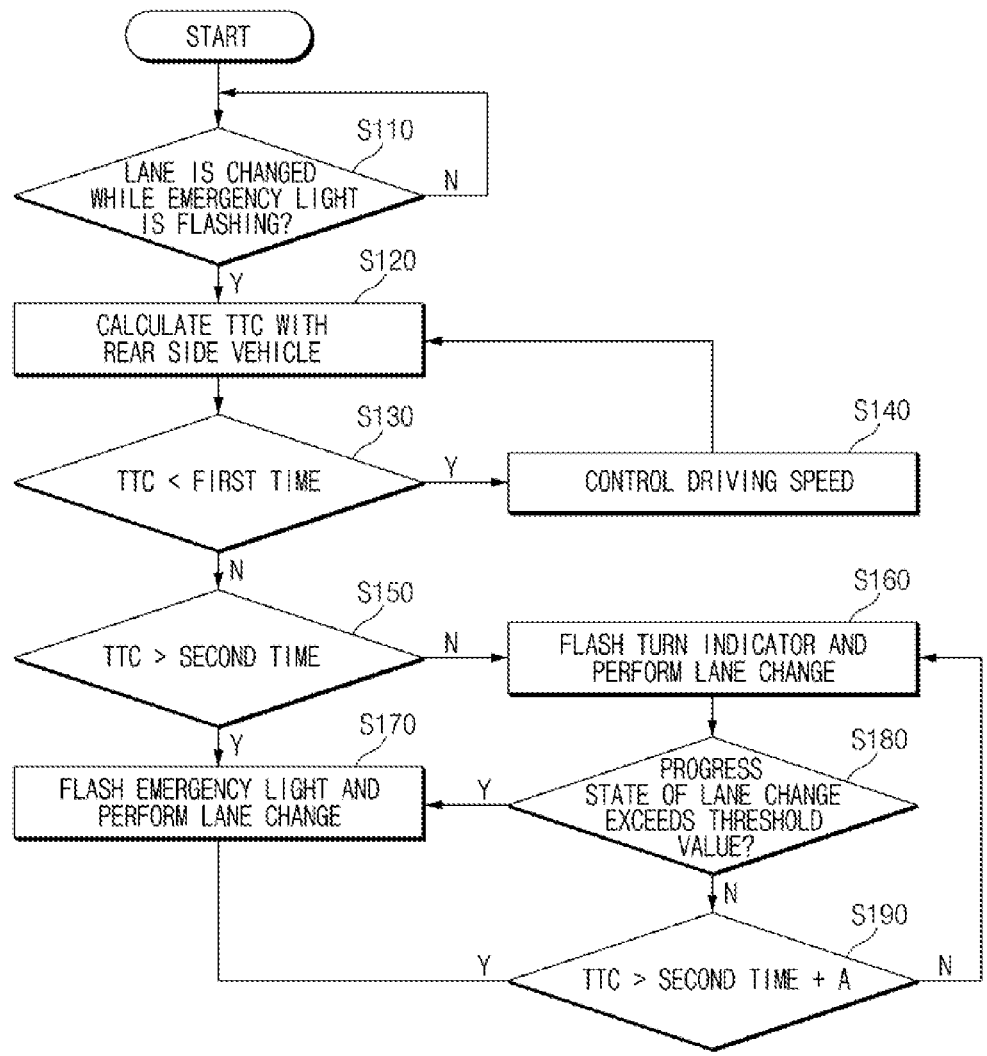
FIG. 5 is a flowchart illustrating a method of controlling driving of a vehicle in one form of the present disclosure.

FIG. 5 is a flowchart illustrating a method of controlling driving of a vehicle in some forms of the present disclosure.

As shown in FIG. 5, in S110, the controller 140 determines whether the vehicle state is a state in which a lane change is to be performed while the emergency light is flashing, based on the driving environment information. In this case, the above-described state may mean a state in which the vehicle performs the lane change while flashing the emergency light according to the MRM state. For example, when driving control authority is not transferred to the driver, the state may mean a state in which the emergency light is flashed and the lane change is performed to safely stop the vehicle. The controller 140 may control the switching of flashing an emergency light or flashing a turn indicator in consideration of the time to collision with the rear side vehicle and the location of the host vehicle.

In detail, in S120, the controller 140 may determine whether the time to collision is less than the first time (where the first time may mean the minimum time to collision for which it is possible to change the lane). In S120, when the controller 140 determines that the time to collision with the rear side vehicle is less than the first time (Y), the controller 140 may determine that it is impossible to change the lane because the time to collision with the rear side vehicle is short. Accordingly, the controller 140 may decrease the driving speed of the vehicle or increase the driving speed while flashing the emergency light in the lane in which the vehicle is traveling until it reaches the lane change time point.

When the controller 140 determines that the time to collision is not less than the first time (N), in S150, the controller may determine whether the time to collision exceeds the second time (where the second time may mean the maximum time to collision for which it is possible to change the lane).

In S150, when the controller 140 determines that the time to collision exceeds the second time, the controller 140 may determine that the lane change is possible without colliding with the rear side vehicle without flashing the turn indicator. According to an embodiment, in S170, the controller 140 may control to perform the lane change while maintaining the flashing of the emergency light.

Meanwhile, in S150, when the controller 140 determines that the time to collision does not exceed the second time (N), the controller 140 may determine that the lane change is possible without colliding with the rear side vehicle, and may switch to the flashing of the turn indicator such that the notification of the lane change of the autonomous vehicle is preferentially guided. Accordingly, in S160, the flashing of the emergency light may be switched to the flashing of the turn indicator, and the lane change may be performed.

When the turn indicator flashes and the lane change is performed, the controller 140 may control the flashing of the emergency light or the turn indicator corresponding to the progress state of the lane change.

The controller 140 may determine the progress state of the lane change during the lane change of a host vehicle 200, and control the flashing of the emergency light or the turn indicator corresponding to the determination result. According to an embodiment, in S180, the controller 140 may determine whether a degree at which the host vehicle 200 is separated from the line exceeds a threshold value in order to determine the progress state of the lane change. In S180, the controller 140 may determine whether the host vehicle 200 exceeds a reference area or a reference distance from a line. In this case, the reference area may mean 80% of the total area of a vehicle, and the reference distance may mean a distance (e.g., 1.5 m) between the vehicle and a line.

In S180, when the controller 140 determines that the host vehicle 200 exceeds the reference area or the reference distance from the line during the lane change (Y), the controller 140 may determine that the lane change of the host vehicle 200 is nearly completed. Accordingly, in S170, the controller 140 may switch from the flashing of the turn indicator light to the flashing of the emergency light, and may perform the lane change until the lane change is completed.

Meanwhile, in S180, when the controller 140 determines that the host vehicle 200 does not exceed the reference area or the reference distance from the line during the lane change, the controller 140 may determine whether the time to collision with the rear side vehicle 210 exceeds (the second time+A). In this case, the 'A' may mean a hysteresis value set such that the switching between the flashing of the emergency light and the flashing of the turn indicator is not repeatedly performed.

In S190, when the controller 140 determines that the time to collision between the host vehicle 200 and the rear side vehicle 210 during the lane change exceeds (the second time+A), the controller 140 may determine that it is possible to change the lane without collision with the rear side vehicle without flashing the turn indicator. According to an embodiment, the controller 140 may switch from the flashing of the turn signal to the flashing of the emergency light and perform the lane change in S170.

When the controller 140 determines in S190 that the time to collision between the host vehicle 200 and the rear side vehicle 210 during the lane change does not exceed (the second time+A) (N), the controller 140 may determine that the lane change is possible without collision with the rear side vehicle and may switch to the flashing of the turn indicator such that the notification of the lane change of the autonomous vehicle is preferentially guided. Accordingly, the flashing of the emergency light may be switched to the flashing of the turn indicator, and the lane change may be performed in S160.

Figure 6:
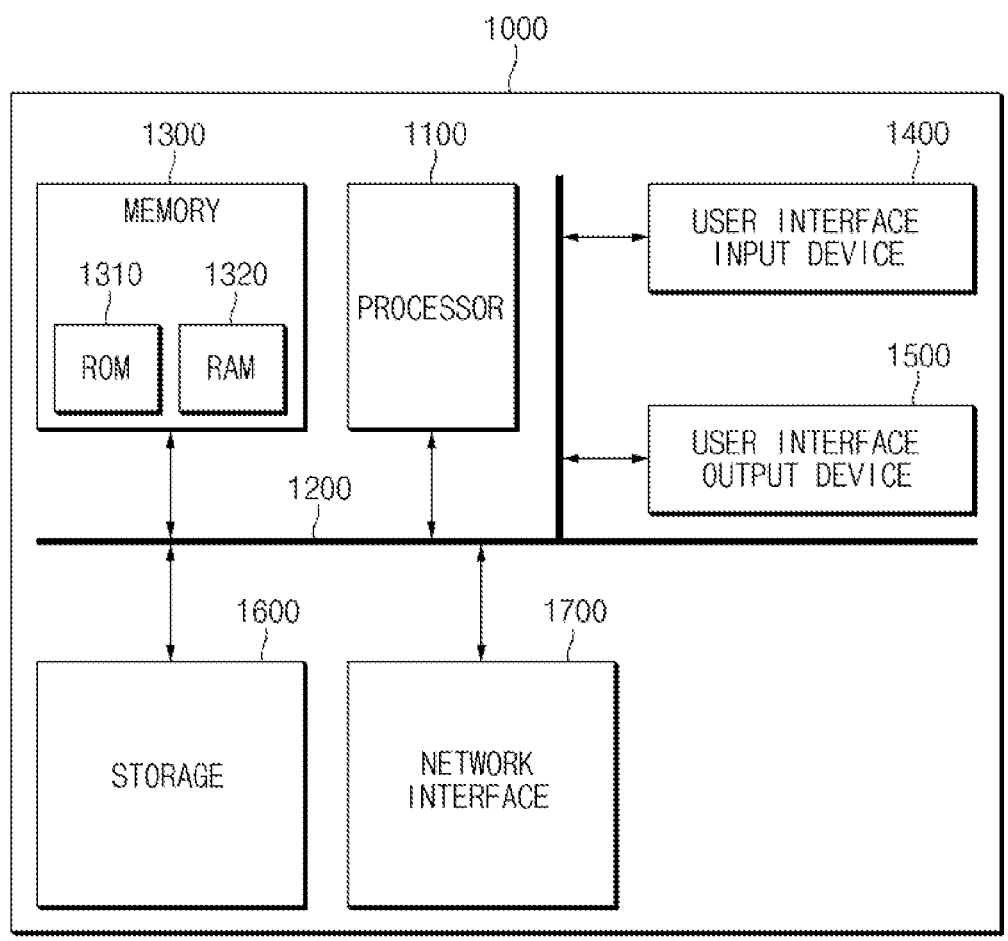
FIG. 6 is a view illustrating a computing system for executing a method in one form of the present disclosure.

FIG. 6 is a view illustrating a computing system for executing a method according to an embodiment of the present disclosure.

Referring to FIG. 6, a computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to an embodiment of the present disclosure, the apparatus and method for controlling driving of a vehicle can control the flashing of an emergency light or a turn indicator based on the time to collision with a rear side vehicle to transmit the state of an autonomous vehicle to the surroundings and enable safe autonomous driving.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling driving of a vehicle, the apparatus comprising:
   a sensor configured to obtain driving environment information and vehicle driving information; and
   a controller configured to:
   calculate a time to collision with a following vehicle based on the driving environment information when a lane change is necessary to be performed while flashing an emergency light; and
   control flashing of the emergency light or a turn indicator based on the time to collision and the vehicle driving information when the lane change is performed,
   wherein the controller is configured to stop flashing the emergency light and perform the lane change while flashing the turn indicator when it is calculated that the time to collision is equal to or greater than a first time and equal to or less than a second time that is longer than the first time.

2. The apparatus of claim 1, wherein a state in which the lane change is necessary to be performed while flashing the emergency light includes a minimal risk management (MRM) state.

3. The apparatus of claim 1, wherein the controller is configured to:
   reduce a driving speed or increase the driving speed while flashing the emergency light in a driving lane when it is calculated that the time to collision is less than the first time.

4. The apparatus of claim 3, wherein the controller is configured to:
   perform the lane change while flashing the emergency light when it is calculated that the time to collision exceeds the second time that is longer than the first time.

5. The apparatus of claim 1, wherein the controller is configured to:
   determine whether a progress state of the lane change exceeds a threshold value; and
   stop flashing the turn indicator and perform the lane change while flashing the emergency light when it is determined that the progress state of the lane change exceeds the threshold value.

6. The apparatus of claim 5, wherein the controller is configured to:
   determine whether the time to collision is greater than or equal to a third time that is longer than the second time when it is determined that the progress state of the lane change does not exceed the threshold value.

7. The apparatus of claim 6, wherein the controller is configured to:
   stop flashing the turn indicator and perform the lane change while flashing the emergency light when it is determined that the time to collision is greater than or equal to the third time.

8. The apparatus of claim 7, wherein the controller is configured to:
   perform the lane Change while flashing the turn indicator when it is determined that the time to collision is less than the third time.

9. A method of control driving of a vehicle, the method comprising:
   obtaining, by a sensor, driving environment information and vehicle driving information;
   calculating, by a controller, a time to collision with a following vehicle based on the driving environment information when a lane change is necessary to be performed while flashing an emergency light; and
   controlling, by the controller, flashing of the emergency light or a turn indicator based on the time to collision and the vehicle driving information when the lane change is performed,
   wherein the controller is configured to stop flashing the emergency light and perform the lane change while flashing the turn indicator when it is calculated that the time to collision is equal to or greater than a first time and equal to or less than a second time that is longer than the first time.

10. The method of claim 9, wherein a state in which the lane change is necessary to be performed while flashing the emergency light includes a minimal risk management (MRM) state.

11. The method of claim 9, further comprising:
    reducing a driving speed or increasing the driving speed while flashing the emergency light in a driving lane when it is determined that the time to collision is less than the first time.

12. The method of claim 11, further comprising:
    performing the lane change while flashing the emergency light when it is determined that the time to collision exceeds the second time that is longer than the first time.

13. The method of claim 9, further comprising:
    determining whether a progress state of the lane change exceeds a threshold value; and
    when it is determined that the progress state of the lane change exceeds the threshold value, slopping flashing the turn indicator and performing the lane change while flashing the emergency light.

14. The method of claim 13, further comprising:
    when it is determined that the progress state of the lane change does not exceed the threshold value, determining whether the time to collision is greater than or equal to a third time that is longer than the second time.

15. The method of claim 14, further comprising:
    when it is determined that the time to collision is greater than or equal to the third time, stopping flashing the turn indicator and performing the lane change while flashing the emergency light.

16. The method of claim 15, further comprising:
    when it is determined that the time to collision is less than the third time, performing the lane change while flashing the turn indicator.

* * * * *